United States Patent [19]
Kemmish et al.

[11] Patent Number: 5,824,402
[45] Date of Patent: *Oct. 20, 1998

[54] AROMATIC POLYETHER

[75] Inventors: David John Kemmish; Alan Branford Newton, both of North Yorkshire; Philip Anthony Staniland, Cleveland, all of England

[73] Assignee: Victrex Manufacturing Ltd., Lancashire, England

[*] Notice: The terminal 5 months of this patent has been disclaimed.

[21] Appl. No.: 487,405

[22] Filed: Jun. 7, 1995

Related U.S. Application Data

[62] Division of Ser. No. 442,149, May 16, 1995, Pat. No. 5,654,393, which is a continuation of Ser. No. 320,790, Oct. 11, 1994, abandoned, which is a continuation of Ser. No. 133,767, Oct. 7, 1993, abandoned, which is a continuation of Ser. No. 911,797, Jul. 10, 1992, abandoned, which is a continuation of Ser. No. 430,351, Nov. 2, 1989, abandoned.

[30] Foreign Application Priority Data

May 8, 1989 [GB] United Kingdom .................. 8910549

[51] Int. Cl.⁶ ...................................... B32B 5/06
[52] U.S. Cl. .................. 428/297.4; 156/166; 428/298.1; 428/299.7; 428/300.7; 524/430; 524/592; 524/609
[58] Field of Search ..................... 524/430, 592, 524/609; 428/297.4, 298.1, 299.7, 300.7; 156/166

[56] References Cited

U.S. PATENT DOCUMENTS

| | | |
|---|---|---|
| 3,928,295 | 12/1975 | Rose ........................................ 428/426 |
| 3,993,628 | 11/1976 | Jarrett et al. . | |
| 4,051,109 | 9/1977 | Barr et al. . |
| 4,052,365 | 10/1977 | Jones . |
| 4,056,511 | 11/1977 | Staniland . |
| 4,169,178 | 9/1979 | Freeman . |

FOREIGN PATENT DOCUMENTS

| | | |
|---|---|---|
| 194062 | 9/1986 | European Pat. Off. . |
| 235885 | 9/1987 | European Pat. Off. . |
| 278720 | 8/1988 | European Pat. Off. . |
| 303389 | 2/1989 | European Pat. Off. . |
| 303337 | 7/1989 | European Pat. Off. . |
| 2425166 | 12/1974 | Germany . |
| 0194062 | 2/1986 | United Kingdom . |
| 0278720 | 9/1988 | United Kingdom . |

OTHER PUBLICATIONS

Attwond, Polymer, 22(8):1006–1103 (1981).

Primary Examiner—James J. Bell
Attorney, Agent, or Firm—Cushman Darby & Cushman IP Group of Pillsbury Madison & Sutro LLP

[57] ABSTRACT

An aromatic polyether contains within its chain the repeat units

—Ph—CO—Ph—   I

—[Ph—SO$_2$—Ph]n—   II at a molar ratio I/II in the range 98:2 to 80:20 where Ph represents paraphenylene; the repeat units are linked through ether oxygen; and n is at least 1.1.

It can be made by reacting together hydroxy and halogeno aromatic compounds corresponding to units I and II and to any minor units that are to be present. The reactants can be provided at least partly by a polymer containing an ether-linked succession of the units.

5 Claims, No Drawings

AROMATIC POLYETHER

This is a division of application Ser. No. 08/442,149, filed May 16, 1995 now U.S. Pat. No. 5,654,393 which is a continuation of Ser. No. 08/320,790, filed Oct. 11, 1994, now abandoned which is a continuation of Ser. No. 08/133,767, filed Oct. 7 1993, now abandoned, which is a continuation of Ser. No. 07/911,797, filed Jul. 10, 1992, now abandoned, which is a continuation of Ser. No. 07/430,351, filed Nov. 2, 1989, now abandoned.

This invention relates to an aromatic polyether, to processes for making it and to shaped articles made from it.

Among aromatic polyethers, those containing sulphone or ketone linkages have come into extensive use when resistance to high temperatures is required. Commercially available polyethersulphones typically have high glass-transition temperatures $T_g$, eg over 180° C. or 200° C. but are amorphous and thus not resistant to organic liquids. Commercially available polyetherketones crystallise readily and resist organic liquids, but their $T_g$ is lower, eg in the range 140–170° C. Previous attempts to increase the $T_g$ of polyetherketones have encountered problems such as requiring the use of very expensive intermediates or resulting in polymer melting points $T_m$ too high for convenient processing.

We have now found a family of polymers that appear to be relatively free of these problems.

In the ensuing description the following abbreviations will be used:

DSC differential scanning calorimetry;

$T_m$ temperature at which the main peak of the melting endotherm is observed;

$T_c$ temperature at which crystallisation occurs on cooling the melt before or after soldification;

$T_g$ glass transition temperature. If the polymer is available in amorphous or crystalline form, suffix A or X is used according as the determination was applied to the amorphous or crystalline form respectively. $T_g$ is determined by DSC unless otherwise stated;

RV reduced viscosity, as measured at 25° C. on a solution of 1.0 g of polymer in 100 cm³ of solution, in 98% $H_2SO_4$ unless otherwise stated.

MV melt viscosity in $KNsm^{-2}$ measured at 400° C. at a shear rate of 1000 $sec^{-1}$.

MFI melt flow index in g per 10 min measured at 400° C. using a 1.18 mm die and loads of 2.16 kg or 10 kg;

%X percentage crystallinity, determined by DSC after annealing at $T_c$ for 30 mins.

The dermination of $T_g$ by DSC is carried out by examining a 10 mg sample of polymer in a Perkin Elmer DSC-4 and/or DSC-7 instrument, using a heating rate of 20° C./min under nitrogen. From the resulting curve the onset of the glass transition is obtained as the intersection of lines drawn along the pre-transition baseline and a line drawn along the greatest slope obtained during the transition.

According to the invention an aromatic polyether contains within its chain the repeat units

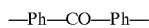    I and

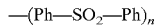    II at a molar ratio I/II in the range 98:2 to 80:20, where Ph represents paraphenylene; the repeat units are linked through ether oxygen; and n is at least 1.1.

The polyether contains preferably at least 75, especially at least 90, weight percent of units I and II. Other repeating units (referred to hereinafter as minor units) can be for example:

$Ph_n$, where n is 1 to 3 naphthylene, especially 2,6- or 2,7-Ar— $(X-Ar)_m$, where X is —O— or —S— or alkylene up to C10 1,3-phenylene with electron-withdrawing substituent in 2-position Ar— $(Y-Ar)_m$ other than unit I or II, where Y is an electron-withdrawing group, especially —$SO_2$ or —CO— (in each case Ar is a divalent aromatic hydrocarbon group especially paraphenylene or 4,4'-biphenylene and m is 1 or 2)

Preferred other repeating units are one or more of:

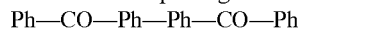
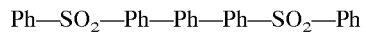
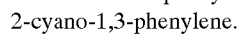

2-cyano-1,3-phenylene.

In unit II n is preferably at least 1.3, especially in the range 1.7 to 3.2, for example up to 2.2, conveniently up to 2.0.

The ratio I/II is preferably at least 96:4 and is typically up to 85:15.

In any one polymer chain the repeating units I and II can be present in regular succession (that is, with single units II separated by equal strings of unit I), or semi-regular succession (that is, with single units II separated by unit I strings not all of the same length) or in irregular succession (that is, with at least some multiple units II separated by strings of units I that may or may not be equal). In any sample of polymer the chains may be equal or may differ in regularity, either as a result of synthesis conditions or of deliberate blending of separately made batches of polymer.

The invention provides a process for synthesising the polyether by reacting together one or more hydroxy aromatic compounds and one or more halogeno aromatic compounds, said compounds corresponding to units I and II and to any minor units that are to be present in the polyether. In one form of the process at least one dihydric phenol is reacted with at least one dihalogen compound. The dihalogen compound preferably carries an electron-withdrawing group in a position ortho or para to its halogens, so that the halogens are activated: such halogens are preferably at least partly fluorine. If no electron-withdrawing group is present, the halogens are preferably chlorine or bromine and a copper-containing catalyst should be present, since without such catalyst that halogen is not reactive enough for synthesis in convenient conditions. In another form of the process the reactants each carry a hydroxy group and a halogen; it is also possible to make the polyether by reacting a mixture containing both the dihydroxy/dihalogen combination and the hydroxy/halogen reactants.

In a modified process for making such a polyether reactants corresponding to the specified units are provided at least partly by a polymer or oligomer containing an ether-linked succession of the units to be present in the polyether. The polyether is then formed by ether-interchange, that is, opening ether links and insertion of other units. Especially if units I and II are both provided by polymers, an alkali metal fluoride, preferably of potassium, rubidium or cesium should be present, instead of or in addition to base as described below.

The reactants can be simple halogen compounds and hydroxy compounds oligomers can be short chain polymers or can be definite precondensates such as F Ph CO Ph O Ph CO Ph F or HO Ph CO Ph O Ph CO Ph OH.

The process conditions include at least one and preferably all of the following:

presence of solvent, especially a sulphoxide or sulphone, most suitably an aromatic sulphone;

presence of base in quantity at least stoichiometrically equivalent to the hydroxy compound;

the base is preferably not strong enough to convert the hydroxy compounds to a bis salt at ambient temperature;

More specifically the solvent has the formula

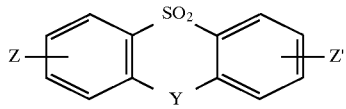

where Y is a direct link, an oxygen atom or two hydrogen atoms (one on each benzene ring) and Z and Z' are hydrogen or phenyl.

The base includes one or more alkali metal carbonates, preferably potassium carbonate. If a mixture of carbonates is used, it preferably includes, to the extent of 0.5 to 5% by moles of the stoichiometric requirement, a carbonate of an alkali metal of atomic number at least as great as potassium, along with carbonates of other alkali metals or alkaline earth metals. The carbonates can be introduced at least partly as bicarbonates, since these decompose to carbonates before or during the polymer-forming reactions. If desired, the mixture of carbonates can be formed by introducing one of the alkali metals as a salt other than a carbonate, whereby the required mixture of carbonates results from double decomposition. If desired, halogen ion (especially fluoride) the same as or different from that which is to be formed as by product of polymer formation, can be added before the start of or during polymer synthesis.

In the preparative procedure the reactants can be brought together in any convenient order. If desired, reaction can be started with a substantial excess of the halogen reactant, continued until a halogen-ended oligomer is formed, then completed with newly-added hydroxy compound. The converse is equally possible. The reactants can be introduced, if desired, as low precondensates, for example using 4,4$^1$-bis-4$^1$-hydroxybenzoyl benzo-phenone in part or complete substitutions for 4,4$^1$-dihydroxybenzophenone.

In any preparation of the polymer, the molecular weight can be controlled by using an excess of halogen reactant or hydroxy reactant, the excess being typically in the range 0.1 to 5.0 mol percent. Such excess can be present from the start, or can be added when reaction is essentially complete. If desired, one or more monofunctional reactants can be present or added as "end-capper". Such excess reactants or monofunctional reactants can be used to decrease molecular weight if required.

If appropriate, the preparation can be carried out or finished in the presence of cations such as lithium or alkaline earths.

In principle the polymers can be made by electrophilic reaction, but this is less convenient.

Polyethers according to the invention have molecular weights typically in the range 2000 to 100000. Those in the range 2000 to 10000 are of use mainly as intermediates in the preparation of higher polymers, such as block copolymers by reaction with suitable monomers, or in compositions containing also thermoset precursors. Those in the range above 9000 are of use for making articles by melt-processing, for example by incorporation with fillers or short fibres or continuous fibres. The polyethers have RV preferably at least 0,7, especially 0.9 to 1.6 and are tough as shown by the flexing test described below. Toughness is, however, present at conveniently low values of melt-viscosity, for example in the range 0.1 to 0.7 Nsm$^{-2}$. The polyethers are crystallisable to the extent typically of 15 to 40% as measured by heat of fusion. When a melt is cooled at moderate to rapid rates, an amorphous solid is formed. This can be caused to crystallise by annealing, suitably by holding at $T_c$+/-20° for 0.1 to 24 h. Such crystallisation is accompanied by an increase in $T_g$ of 4–10° C. It is also possible to obtain polyether in crystalline form and with the higher $T_g$ by cooling at a low enough rate.

Polyethers according to the invention can be melt-processed to articles having properties generally associated with homopolyetherketones, especially resistance to organic reagents such as solvents, fuels and functional fluids. They have, moreover, glass transition temperatures $T_g$ typically over 160 deg C., possibly over 170 deg C., which are substantially higher than can readily be obtained in the polyetherketone family. The polyarylethers according to the invention are substantially cheaper than polyetherketones of our copending EP-A-194062 since they are made without use of 4,4'-difluoro benzoyl biphenyl.

The test of toughness of the polymer is applied to a thin film (about 0.2 mm thick) thereof formed by compression moulding at 400° C. under a pressure of 20320 kg for 5 min, cooling the film in the moulding press to 120° C. over 30 min and then in ambient air; such slow cooling permits substantial crystallisation. The resulting film is hinged through 180° (ie so that the two faces of the film formed about the film touch), then hinged back and forth through 360° several—at least 5—times. If the film survives this treatment without breaking, it is deemed to be tough; if not, it is deemed to be brittle.

This test applies particularly to polymer containing less than 10% w/w of fibrous or other filler, such as is typically used in wire insulation.

The polymers can be used neat or with conventional additives, for example organic or inorganic fibres, particulate fillers, other polymers, pigments, nucleating agents and stabilisers such as phosphates. They can be shaped in conventional ways to produce for example fibres, films or granules or more complicated articles.

When the polymers are incorporated with fibres of eg glass or carbon or alumina at a concentration of 5–40% by volume, the resulting composition has a usefully high heat distortion temperature of for example 280°–320° C. when tested at 264 psig in conditions specified in ASTM D646. This property is especially useful in making articles by injection moulding, since articles previously available only in metal can be economically produced. In such compositions the fibres are of length typically 0.5 to 5.0 mm.

The polymers are very suitable for prepreg and laminate making by incorporation with continuous fibres.

In particular the invention provides a prepreg comprising collimated continuous fibre impregnated with polymer as hereinbefore defined containing typically 20 to 80, especially 40 to 60 or up to 75 weight percent of fibres, and having a thickness typically in the range 0.05 to 0.5 mm.

Such prepreg is preferably made by passing such continuous fibre through a melt, optionally containing a plasticiser, of the polymer. A suitable procedure comprises:

a) feeding continuous fibre downwards tangentially through a nip between horizontal-axis approximately cylindrical surfaces heated at above the flow temperature of the melt;

b) maintaining a pool of melt in the nip between the fibre and the surface;
c) evaporating any volatiles from the resulting impregnated fibre. This procedure is operated preferably with one or more of the following preferred features:
   i) the plasticiser, if used, is volatilisable, and is suitably one or more of the compounds defined hereinbefore as a solvent to be used in synthesising the polymer. Such solvents are solids at ambient temperature and can thus be brought into a powder-form mixture with the polymer. From 0.5 to 3.0 parts by weight of plasticiser per part of polymer are suitably used;
   ii) the pool of melt is extended upwards in a vessel mating with the cylindrical surfaces and is maintained by feeding powdered polymer, with solid plasticiser if used, to the vessel;
   iii) the fibres are passed over one or more rollers under the surface of the melt;
   iv) evaporation of volatiles from the prepreg is effected by passing it over at least one further hot surface and, in any event, by contacting it with flowing hot gas such as air. The plasticiser is recovered and re-used.

These impregnation procedures are described in more detail in our EP 56703, 102158 and 102159.

The invention provides a laminate of plies of such prepreg. This can be for example anisotropic with fibres in successive plies mutually parallel, or to a desired extent isotropic as a result of laying up successive plies with angularly displaced fibre directions. For example, in a quasi-isotropic laminate each ply of fibres is oriented at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, are also provided. Suitable laminates contain at least 4 preferably at least 8, plies. The number of plies is dependent on the application for the laminate, for example the strength required, and laminates containing 32 or even more, for example several hundred, plies may be desirable.

In an alternative procedure the polymer is applied to fibres in 2-dimensional form, for example as woven or non-woven cloth or paper. The resulting prepreg can be laminated to form structures.

In a further alternative procedure the polymer can be applied to fibres by casting it into film, sandwiching layers of such film with layers of fibres and causing impregnation of the fibres by heating to above the flow temperature of the polymer and applying pressure.

EXAMPLE 1

A series of polymers a to d was prepared from the following monomers:

BDF: 4,4[1]-difluorobenzophenone at 45, 45, 42.5 and 40 mol % plus 2 mol % to control molecular weight LCDC: 4,4[1]-bis(4-chlorophenylsulphonyl)biphenyl at 5,5, 7.5 and 10 mol %

DHBP: 4,4'-dihydroxybenzophenone at 50 mol %.

On the scale of 0.1 g mole of DHBP the monomers with 1.5 to 2 times their weight of diphenyl sulphone were charged to a 250 ml round-bottomed flask equipped with nitrogen inlet, stainless steel stirrer and condenser arm and purged with dry nitrogen overnight.

The mixture was melted at 150° C. in an oil bath and to it was added over 15–30 min a dried sieved mixture of sodium carbonate equivalent to the DHDP and potassium carbonate (2% mol excess). The mixture was then heated as follows;

| | |
|---|---|
| 175° C. | 20–30 min |
| 200 | 60 |
| 250 | 30 |
| 320 | 150 | while maintaining the purge of nitrogen.

The flask contents were poured out on to a foil tray and allowed to cool. The solid "toffee" was milled to pass a 2 mm sieve and leached with acetone and then with hot demineralised water. The leached material was dried overnight at 120° C.

The unit compositions and properties of the polymers are shown in Table 1.

TABLE 1

| Polymer | | | | | | | | | | | |
|---|---|---|---|---|---|---|---|---|---|---|---|
| | units | | | MV | MFI | $T_g$ (X) | $T_g$ (A) | $T_c$ | $T_m$ °C. | | |
| No | I | II | RV | $KNsm^{-2}$ | 2.16  10 | °C. | °C. | °C. | powder | reheat | % (X) |
| a | 95 | 5 | 1.52 | 0.69 | ND  ND | 171 | ND | 287.3 | 390.5 | 350.9 | 31.3 |
| b | 95 | 5 | 1.08 | 0.31 | ND  ND | 167 (173) | ND | 302 | 365.1 | 359.3 | 32.2 |
| c | 92.5 | 7.5 | 0.95 | 0.25 | 6.3  17.5 | 175.4 | 166.6 | 277 | 358.7 | 353.3 | 30.4 |
| d | 90 | 10 | 0.93 | 0.24 | 2.7  12.4 | 179 (185) | ND | 254.5 | 354.2 | 341.7 | 29 |
| PEK | 100 | 0 | | 0.22 | | 155* (158.5) | | | | | ca 35 |
| PEEK | 50 | — | | 0.18 | | 143* | | | | | 35–40 |

Notes:
ND = not dermined
* = literature values
( ) = signify values determined by Dynamic Mechanical Thermal Analysis

EXAMPLE 2 a) The procedure of Example 1(c) was repeated using various mixtures of LCDC and 4,4[1]-dichlorodiphenylsulphone (DCDPS) in place of the LCDC. The $T_g$ and $T_m$ values of the resulting polymers are shown in Table 2.

TABLE 2

| Mol percent | | Value of n in | | | $T_m$ |
|---|---|---|---|---|---|
| LCDC | DCDPS | $(Ph\ SO_2\ Ph)_n$ | RV | $T_g$ | (reheat) |
| 90 | 10 | 1.9 | 0.95 | 172.6 | 356 |
| 80 | 20 | 1.8 | 0.93 | 171.2 | 358 |
| 50 | 50 | 1.5 | 1.07 | 166.5 | 357.7 |
| 20 | 80 | 1.2 | 0.89 | 164.2 | 356.8 |

It is evident that a useful increase in $T_g$ over PEK (154° C.) is obtained when the value of n is 1.2 or possibly even less, and that the preferred $T_g$ of 170° C. results from n values of 1.7 and over.

EXAMPLE 3

Preparation of composite.

A sample of polymer made as in Example 1c but on a larger scale was ground finely and mixed with twice its weight of DPS powder by tumbling in a closed container. The mixture was used in the following procedure. A set of 52–56 collimated tows of continuous carbon fibres ('Magnamite' AS-4 as supplied by Hercules Inc of Delaware USA), each tow containing about 12000 individual filaments, were drawn at a rate of about 700 mm/min over a set of stationary guide bars to provide a band of width about 350 mm having a total web tension of 25 kg. When the fibres had reached a contiguous relationship they were pulled downwardly over 2 stationary cylindrical bars 16 mm in diameter heated to about 390° C. in a hopper and then through the nip of 2 rotating rollers 50 mm in diameter heated at about 400° C.; the bottom edges of the hopper mate with the rollers to extend the volume of the nip. Polymer/DPS mixture was added to the hopper, allowed to melt and then fed at a rate sufficient to keep the level of melt above the stationary bars. The resulting impregnated fibre web was fed out downwardly through the rollers, under and over 3 bars, through a tunnel in which hot air was passed to carry of the vapour of DPS, then under and over 2 further bars. These bars were 37 mm in diameter and were stationary and held at about 415° C. The web then passed under a bar at about 350° C. where excess polymer was removed and finally under a bar at 130° C. at which it was cooled rapidly enough to prevent crystallisation of the polymer. The product was a continuous tape 315 mm wide and about 0.125 m thick containing 68% by weight of carbon fibre which had been well wetted by the polymer.

For mechanical testing, various samples of the tape were taken, with layups and moulding cycles as described below. In detail the mouldings cycles (MC) were as follows

| MC | Consolidation (first press) | Cold press (second after transfer) | Anneal |
|---|---|---|---|
| 1 | 210 psi, 400° C., 5 min | 300 psi, 260° C., 10 mins | — |
| 2 | 200 psi, 400° C., 5 min | 300 psi, 200° C., 5 mins | Contact pressure 280° C., 30 mins |

Test results were as follows.

TABLE 3

Room temperature properties

| Lay-up | MC | Test Code | Property | Measured value |
|---|---|---|---|---|
| $[0]_8$ | 1 | ASTM D 3039-76; gauge length 175+/− 5 mm | 0° Tensile modulus, GPa strength, MPa Failure strain % | 138 2030 1.37 |
| $[0]_{16}$ | 1 | AFML—TR-72-205 IITRI compression; gauge length 15 mm | 0° Compressive strength, MPa | 1028 |
| $[0]_{16}$ | 1 | ASTM D790M-84; Span (50+/−5)t, where t = specimen thickness | 0° Flexural modulus, GPa strength, MPa | 120 2064 |
| $[0]_{16}$ | 1 | ASTM D2344-84; Span = 5t | Short beam shear strenth, MPa | 102 |
| $[90]_{16}$ | 1 | ASTM D790M–84 ; Span (25+/−5)t | 90 deg flexural strength, MPa | 123 |
| $[X]^{+55}$ | 2 | NASA Contract Report 159293; 40-ply Q-I laminate | Residual compressive strength after 1500 in lb/in impact, MPa | 349 |

+: X denotes −45/0/+45/90

TABLE 4

Effect of methylene chloride*

| | | | | Measured value | |
|---|---|---|---|---|---|
| Lay-up | MC | Test code | Property | Before | After |
| $[90]_{16}$ | 1 | ASTM D790M-84 | 90 deg flexural strength, MPa | 105 | 110 |
| | | Span (25+/−5)t | % retention of dry value | 100 | 105 |
| | | | weight uptake % | — | 0.07 |

*Specimens dried 4 days at 82 deg C., then conditioned 24th in methylene chloride at ambient temperature.

TABLE 5

Open-hole hot/wet compressive strength

| Conditioning | Temp of test deg C. | *Measured value, MPa | Open-hole compressive strength % of ambient dry value |
|---|---|---|---|
| [Y]³⁰ 2 96h in boiling water | 149 | 260 | 71 |
| — | 163 | 220 | 60 |
| none | ambient | 366 | 100 |

*On a test specimen of 24-ply laminate 76 × 25 mm with 6.4 mm hole machined at its centre.
+: Y denotes +45/−45/90/O₂/+45/−45/O₂/+45/−45/O

EXAMPLE 4

(This incorporates Example 2c of the priority application)

Syntheses using polymer as source of units (a) polyethersulphone with polyetherketone monomers.

The Example 1 procedure was repeated using these ingredients.:

| BDF | 22.26g | 0.102 mol |
|---|---|---|
| DHB | 21.42 | 0.100 |
| PS* | 10.2 | 0.0154 |
| DPS | 90 | — |
| Na₂CO₃ | 10.6 | 0.100 |
| K₂CO₃ | 0.28 | 0.002 |

*Polyethersulphone consisting of units PhSO₂PhPhSO₂Ph and PhSO₂Ph ether-linked in molar ratio 50:50.

(b) polyethersulphone with polyetherketone monomers
Run (a) was repeated using 0.104 mol of BDF.

(c) polyetherketone with polyethersulphone (no monomers) The ingredients were

| polyetherketone (nucleophilic all units I ether-linked RV 1.26) | 36.26g | 0.185 mol |
|---|---|---|
| PS (as in run a) | 10.2 | 0.0154 |
| DPS | 200 | — |
| potassium fluoride | 0.232 | 0.004 |

These were melted together and stirred at 340° C. for 4 hrs.

Thermal data and crystallinity of the resulting polymers are set out in Table 6.

In addition, a synthesis (d) was carried out using the polyetherketone and the monomers (LCDC and 4,4'-dihydroxydiphenyl sulphone) of PS. The product was substantially the same as that of run (b).

TABLE 6

| Polymer | RV | Tg | Tm powder | Tm reheat | % (X) |
|---|---|---|---|---|---|
| a | 1.92 | 175.5 | 342 | 326 | 23.1 |
| b | 1.1 | 175.4 | 353.7 | 348.3 | 25.0 |
| c | 1.1 | 177.9 | 345.9 | 341.6 | 28.6 |

The Tg, Tm and crystallinity of polymer a show that it is blocky, that is, the starting polyethersulphone was incompletely transetherified. In polymers b and c and also in d, C¹³ shows that substantially complete transetherification had taken place.

We claim:

1. A composition containing an aromatic polyether and 5–40 volume percent of fibers, said polyether containing within its chain the repeat units Ph—CO—Ph—    I and —[Ph—SO₂—Ph]$_n$    II at a molar ratio I/II in the range 98:2 to 80:20 wherein Ph represents paraphenylen;
   the repeat units are linked through ether oxygen; and
   n is at least 1.1.

2. A prepreg comprising collimated continuous fibre impregnated with a polymer, said prepreg containing 20 to 80 weight percent of fibres and having a thickness in the range 0.05 to 0.5 mm, said polymer containing within its chain the repeat units Ph—CO—Ph—    I and —[Ph—SO₂—Ph]$_n$    II at a molar ratio I/II in the range 98:2 to 80:20 wherein Ph represents paraphenylene;
   the repeat units are linked through ether oxygen; and
   n is at least 1.1.

3. A laminate of plies of prepreg according to claim 2.

4. A process for making a prepreg according to claim 2 which comprises passing continuous fibre through a melt of the polymer.

5. A process according to claim 4 which comprises:
   a) feeding continuous fibre downwards tangentially through a nip between horizontal axis approximately cylindrical surfaces heated at above the flow temperature of the melt;
   b) maintaining a pool of the melt in the nip between the fibre and the surface.
   c) evaporating any volatiles from the resulting impregnated fibre.

* * * * *